United States Patent [19]
Brück et al.

[11] Patent Number: 6,025,578
[45] Date of Patent: Feb. 15, 2000

[54] ELECTRICALLY INSULATING LEAD-THROUGH ASSEMBLY WITH ELECTROCORROSION PROTECTION

[75] Inventors: Rolf Brück, Bergisch-Gladbach; Norbert Bergau, Much, both of Germany

[73] Assignee: EMITEC Gesellschaft fuer Emissionstechnologie mbH, Lohmar, Germany

[21] Appl. No.: 09/037,000

[22] Filed: Mar. 9, 1998

Related U.S. Application Data

[63] Continuation of application No. PCT/EP96/03809, Aug. 29, 1996.

[30] Foreign Application Priority Data

Sep. 7, 1995 [DE] Germany ............... 195 33 088

[51] Int. Cl.⁷ .................................................. H05B 3/08
[52] U.S. Cl. ........................... 219/541; 422/177; 60/300; 204/286
[58] Field of Search ....................... 219/481, 200, 219/201, 202, 205, 206, 208, 520, 523, 541, 542, 544; 392/441, 449, 451, 457; 204/286, 247.4, 196.08; 422/177, 174, 179, 180; 60/300–302

[56] References Cited

U.S. PATENT DOCUMENTS

| | | | |
|---|---|---|---|
| 3,116,401 | 12/1963 | Drugmand | 392/457 |
| 3,176,115 | 3/1965 | Balis | 392/457 |
| 3,838,384 | 9/1974 | Jacobs | 204/247.4 |
| 4,152,578 | 5/1979 | Jacobs | 392/457 |
| 4,219,857 | 8/1980 | Haraldsson et al. | 392/457 |
| 4,543,469 | 9/1985 | Cunningham | 392/457 |
| 4,830,724 | 5/1989 | Houle | 204/196.08 |
| 5,023,928 | 6/1991 | Houle et al. | 392/457 |
| 5,335,311 | 8/1994 | Groothuizen | 392/457 |
| 5,411,711 | 5/1995 | Swars | 422/177 |
| 5,618,462 | 4/1997 | Swars | 219/541 |

FOREIGN PATENT DOCUMENTS

| | | |
|---|---|---|
| 0 716 558 A2 | 6/1996 | European Pat. Off. . |
| 29 15 163 | 10/1979 | Germany . |
| 2 073 969 | 8/1995 | Spain . |
| WO92/02714 | 2/1992 | WIPO . |
| WO93/05284 | 3/1993 | WIPO . |
| WO94/18442 | 8/1994 | WIPO . |

OTHER PUBLICATIONS

Patent Abstracts of Japan No. 61 110 786 (Kobayashi), dated May 29, 1986.

*Primary Examiner*—Tu Ba Hoang
*Attorney, Agent, or Firm*—Herbert L. Lerner; Laurence A. Greenberg

[57] ABSTRACT

An electrically insulating lead-through assembly through which an electrical conductor passes through a metal casing. The metal casing belongs to an exhaust gas system of an internal combustion engine, in particular to an electrically heatable catalytic converter. A metallic sleeve which is welded to the casing defines the lead-through opening through which the conductor extends. The lead-through assembly is protected against electrocorrosion by a sacrificial electrode which is disposed on the sleeve, on the casing in the vicinity of the sleeve, or on a housing covering the lead-through. Alternatively, a ground connector may be connected in the vicinity of the lead-through.

13 Claims, 5 Drawing Sheets

ELECTRICALLY INSULATING LEAD-THROUGH ASSEMBLY WITH ELECTROCORROSION PROTECTION

CROSS REFERENCE TO RELATED APPLICATION

This is a continuation of copending international application PCT/EP96/03809, filed Aug. 29, 1996, which designated the United States.

SUMMARY OF THE INVENTION

The invention pertains to an electrically insulating lead-through assembly for at least one electrical conductor through a metal casing of an exhaust gas system of an internal combustion engine, in particular of an electrically heatable catalytic converter.

Air pollution caused by motor vehicle exhaust gases is at the center of interest in terms of environmental policy. Several states and federal agencies have over the last few years promulgated and passed increasingly stringent exhaust gas legislation and guide rules. The requirements are intended to reduce the emission of pollutants from internal combustion engines. Increasingly more complex exhaust gas cleaning systems for internal combustion engines are being used in the light of the rising requirements for a reduction in the level of pollutants in exhaust gases from motor vehicles. Particularly in order to reduce pollution emissions during the cold-start chase of internal combustion engines, electrically heatable catalytic converters are being used, besides regulated three-way catalysts. Such a system is known, for example, from U.S. Pat. No. 5,411,711 to Swars (WO 92/02714). Problems are involved with electrically heatable catalytic converters of that kind in regard to the electric lead-through assembly of electrical conductors which lead from a voltage source to the electrically heatable catalytic converter. A proposed solution in terms of an electric lead-through assembly is known from U.S. Pat. No. 5,618,462 to Swars (WO 94/18442). It has been found that the electric lead-through assembly and/or electrical conductors can be damaged by corrosion.

SUMMARY OF THE INVENTION

It is accordingly an object of the invention to provide an electrically insulated lead-through assembly with electrocorrosion protection, which overcomes the above-mentioned disadvantages of the heretofore-known devices and methods of this general type and which is more resistant to corrosion.

With the foregoing and other objects in view there is provided, in accordance with the invention, an electrically insulating lead-through assembly, comprising:
  a metal casing of an exhaust gas system of an internal combustion engine, the metal casing having an opening formed therein;
  a metal sleeve attached to the casing and extending through the opening;
  an electrical conductor extending through the metal sleeve; and
  a protective configuration protecting the lead-through assembly against electrocorrosion, the protective configuration including a sacrificial electrode which is electrically connected to the sleeve.

In accordance with an added feature of the invention, sacrificial electrode is disposed directly on the sleeve, it is preferably an annular electrode, and it is force-locked or form-locked onto the sleeve.

The electrically insulating lead-through assembly according to the invention is particularly suitable for electrically heatable catalytic converters. The assembly is protected against electro-corrosion. The invention is based on the premise that corrosion of the lead-through assembly is essentially caused by the provision of galvanic elements in the region of the lead-through assembly. By virtue of the various metal materials in the lead-through assembly, with individual components being at different electrical potentials, galvanic elements are formed when an electrolyte is added. An electrolyte may be water, in particular salt water. The lead-through assembly is provided with a protection means in order to put a stop to the electrocorrosion caused by the formation of galvanic elements.

In a preferred embodiment of the lead-through assembly, the at least one sacrificial electrode is electrically connected to the sleeve. That arrangement admittedly does not prevent the formation of galvanic elements, but electrocorrosion is shifted from the components of the lead-through assembly to the sacrificial electrode. That reduces corrosion of the lead-through assembly. A preferred embodiment of the protection means is one in which the sacrificial electrode is disposed on the sleeve. That sacrificial electrode is of an annular configuration and is force-lockingly and/or positively lockingly connected to the sleeve. The sacrificial electrode can be replaced when required by virtue of its connection to the sleeve. Mounting the sacrificial electrode on the sleeve also affords the advantage that the sacrificial electrode can be subjected to visual examination without extensive dismantling operations being required. To force-lockingly connect the sacrificial electrode to the sleeve, it is opposed that the sacrificial electrode is pressed onto the sleeve or is shrunk thereon in a hot condition.

In accordance with an additional feature of the invention, the sacrificial electrode is disposed on the casing and is electrically connected to the sleeve. Preferably, the sacrificial electrode is releasably connected to the casing, thus allowing ready exchange and retrofitting when a sacrificial electrode is spent. The electrode may be connected to the casing with a bolt or pin.

Furthermore, there is the possibility of arranging a plurality of sacrificial electrodes on the casing so that it is possible to avoid spatial restriction in regard to the sacrificial electrode, as can be the case when the sacrificial electrode is arranged on the sleeve. The electrical connection between the sacrificial electrode and the sleeve is preferably formed by a lead of a material which is a good electrical conductor, such as a copper wire.

The conductor of the leadthrough assembly is connected to a voltage source by way of an electric lead. Contact bodies are used for connecting the electric lead to the conductor. In accordance with a further embodiment of the invention, the sacrificial eletrode is provided on the contact body. That arrangement has the advantage that it is possible to retain the previously wconventional process for the production of an electrically heatable catalytic converter. In order to produce sound contact between the conductor and the contact body, it is proposed that the conductor is adapted to be connected to the contact body in positively locking (form locking) and/or force-locking (friction fit) relationship.

In accordance with again an added feature of the invention, therefore, the metal sleeve has an end surface protruding from the casing, and the protective configuration including an electrically non-conducting protective layer covering the end surface of the sleeve. The protective layer may comprise for example zinc, which is anodic. In accordance with several advantageous features, the protective layer has porefree outer surface, it is formed with hydrophobic material, it may include at least a layer of plastic material, such as silicone. Alternatively, the protective layer includes at least a layer of glass.

Besides the above-described alternative forms of the sacrificial electrode, it can also be disposed directly on an electric lead which is connected at the one hand to the conductor and a the other hand to a voltage source. In that case the sacrificial electrode can for example be squeezed on the electric lead.

In accordance with another feature of the invention, the sacrificial electrode is formed of a material having a lower reduction potential in the electromotive series than a material of the conductor. The material in the preferred embodiment is zinc. In other words, the sacrificial electrode is produced from a material which is lower (more negative) in the electromotive series of metals than the material of the conductor and the sleeve. The electrode preferably comprises zinc. Zinc has a normal potential of –0.76V in the electromotive series. An electrode of nickel has a normal potential of –0.24 V. Both sacrificial electrodes form the negative terminal of the galvanic element.

In an alternative embodiment, the protective configuration preventing electrocorrosion of the lead-through assembly is connected to lengthen an electric current path of a galvanic element formed at the lead-through assembly. By virtue of the fact that electrical resistance also depends inter alia on how long the electrical run is, the increase in length of the current path produces a resistance which reduces a current flow and the electrocorrosion resulting therefrom. The increase in length of the path for an electric current is of particular interest in connection with electrically heatable catalytic converters which are operated at relatively high voltages.

For example an Electrically heatable catalytic converter of that kind can be operated at a voltage of about 30 volts. In regard to the more specific design configuration of the protection means, it is proposed that the protection means is formed by an electrically non-conducting protective layer which has at least one layer portion and which covers over at least the end face of the sleeve which projects out of the casing. Preferably the protective layer or the outer layer portion thereof comprises a hydrophobic material. That ensures that electrolyte accumulations in the form of water which first cause the occurrence of electrocorrosion are not formed on the protective layer.

In accordance with again another feature of the invention, the protection means is an electrical connection of the casing to ground potential. That prevents a build-up of potential in the region of the electrical negative terminal of the electric lead-through assembly, whereby the effect of electrocorrosion is effectively prevented.

In accordance with yet another feature of the invention, the lead-through assembly is protected with a housing of an electrically insulating material. The protective layer may completely enclose the outside surface of the sleeve and it may be at least partially formed on the casing. The housing is fluid-tightly formed on the sleeve and has at least one conductor passage. That provides for encapsulation of the lead-through assembly whereby an electrolyte does not come into contact with the components of the lead-through assembly.

A preferred configuration of the protection means is one in which at least one sealing element is provided between the housing and the sleeve. The sealing element is preferably arranged on the sleeve. The sealing element can be for example in the form of an O-ring.

In order to ensure that in rough conditions of operation for example of a private motor vehicle the housing remains on the sleeve and does not slip off the sleeve due to vibration and shaking, it is proposed that the housing is arranged on the sleeve in such a way that it cannot be pulled off the sleeve. Mounting the housing on the sleeve in such a way that it cannot be pulled of it is preferably effected by at least one securing element which engages into an undercut configuration provided in the sleeve. The securing element may be for example a cotter or split pin, a ring or a U-shaped loop member. It is preferred to releasably connect the element to the housing. In that respect the securing element may be disposed or formed in the inner surface of the housing. There is also the possibility of the housing having at least one opening through which for example a cotter or split pin extends.

The housing in the currently best mode comprises a plastic material. When using such a housing, a securing element in the form of a collar which is formed on the housing is preferred. In that arrangement the collar engages into the undercut configuration provided in the sleeve. The collar formed on the housing can be integral therewith. A preferred embodiment of the collar is one in which it is of a resilient nature. In that case the housing is connected to the sleeve on the basis of a snap-engagement effect. The housing is most easily produced by a plastic injection molding process.

Other features which are considered as characteristic for the invention are set forth in the appended claims.

Although the invention is illustrated and described herein as embodied in electrically insulating lead-through assembly with electrocorrosion protection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
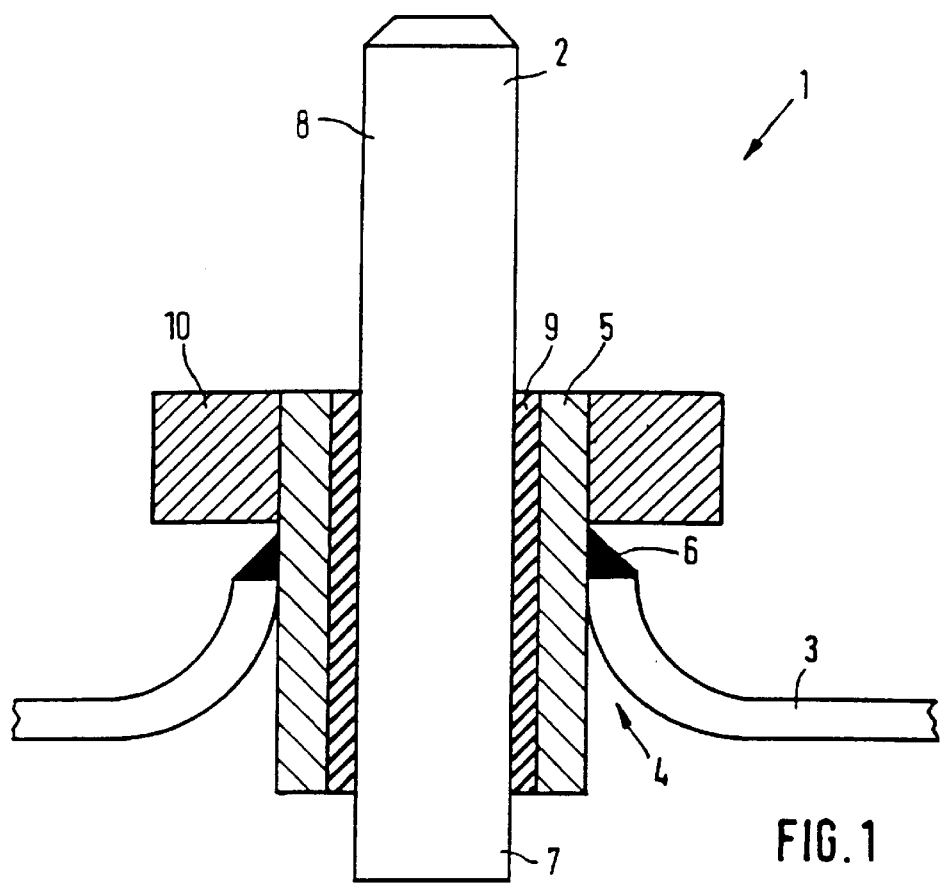
FIG. 1 is a partial sectional view of a first embodiment of a lead-through assembly with a sacrificial electrode.

Referring now to the figures of the drawing in detail and first, particularly, to FIG. 1 thereof, there is seen a first embodiment of an electrically insulating lead-through assembly 1 wherein an electrical conductor 2 passes through a metal casing 3 of an exhaust gas system of an internal combustion engine. In particular, the casing 3 is a jacket of an electrically heatable catalytic converter. The structure of such a catalytic converter is described, for example, in the above-noted U.S. Pat. No. 5,411,711.

A through opening 4 is formed in the casing 3 through which a bush or sleeve 5 extends. The metal sleeve 5 is welded to the casing 3. Reference 6 denotes the weld seam between the sleeve 5 and the casing 3. The conductor 2 extends coaxially in the sleeve 5. An end 7 of the conductor 2 which projects into the casing 3, is in electrical contact with a non-illustrated catalytic converter. An end 8 of the conductor 2 which projects away from the casing 3 out of the sleeve 5 allows coupling to an electrical conductor (cf. FIG. 7) which is connected to a voltage source.

An electrical insulator 9 is disposed between the conductor 2 and the sleeve 5. The insulator 9 ensures electrical decoupling between the sleeve 5 and the conductor 2. The insulation 9, by way of example, may be aluminum oxide.

With reference to FIG. 1, the sleeve 5 projects outwardly out of the casing 3. A sacrificial electrode 10 is disposed at that projecting end region of the sleeve 5. The sacrificial electrode 10 is force-locked (friction fit) to the sleeve 5. The sacrificial electrode 10 has an annular form. The inner and outer contours of the sacrificial electrode 10 may be adapted to the structural features of the sleeve 5 and other environmental factors.

The sacrificial electrode 10 is preferably a zinc block. If an electrolyte for example in the form of salt water accumulates above the sleeve 5 and contact occurs between the conductor 2 and the sleeve 5, then an electric current flows by way of the sacrificial electrode 10 whereby the sacrificial electrode 10 corrodes. That prevents the sleeve 5 or the conductor 2 from corroding.

Figure 2:
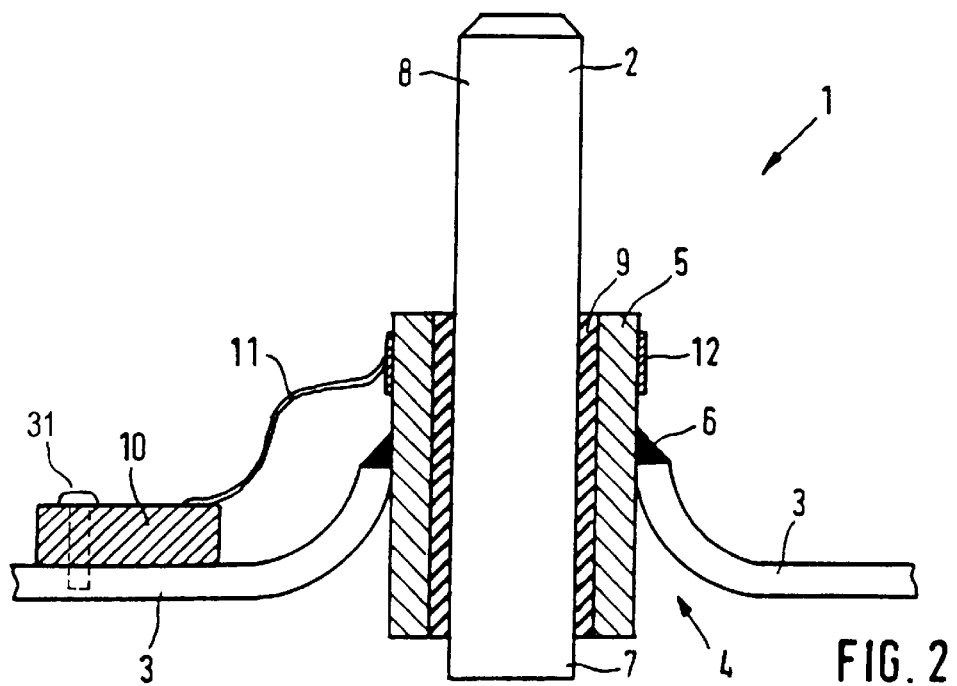
FIG. 2 is a similar view of a second embodiment of a lead-through assembly with a sacrificial electrode.

FIG. 2 shows a second embodiment of an electric lead-through assembly with a sacrificial electrode. The structure in principle of the lead-through assembly 1 shown in FIG. 2 corresponds to that of FIG. 1. The electrical conductor 2 projects through the sleeve 5. An insulation 9 is provided between the sleeve 5 and the electrical conductor 2. The sleeve 5 is provided in a through opening 4 in the casing 3. The sleeve is welded to the casing 3.

The sacrificial electrode 10 of the second embodiment is disposed on the casing 3 of a housing of a catalytic converter. The sacrificial electrode 10 may be secured with a bolt or pin 31 which is connected to the casing 3. The sacrificial electrode 10 is connected to the sleeve 5 by way of an electric lead 11. The lead 11 is preferably formed by a copper wire. A ring or collar portion 12 is disposed on the sleeve 5. The collar 12 is formed of a material which is a good electrical conductor and it is connected to the electric lead 11. The embodiment shown in FIG. 2 has the advantage that the sacrificial electrode 10 may be replaced relatively easily. Furthermore, the electrode 10 may be visually inspected very easily without a great deal of trouble and expense.

Figure 3:
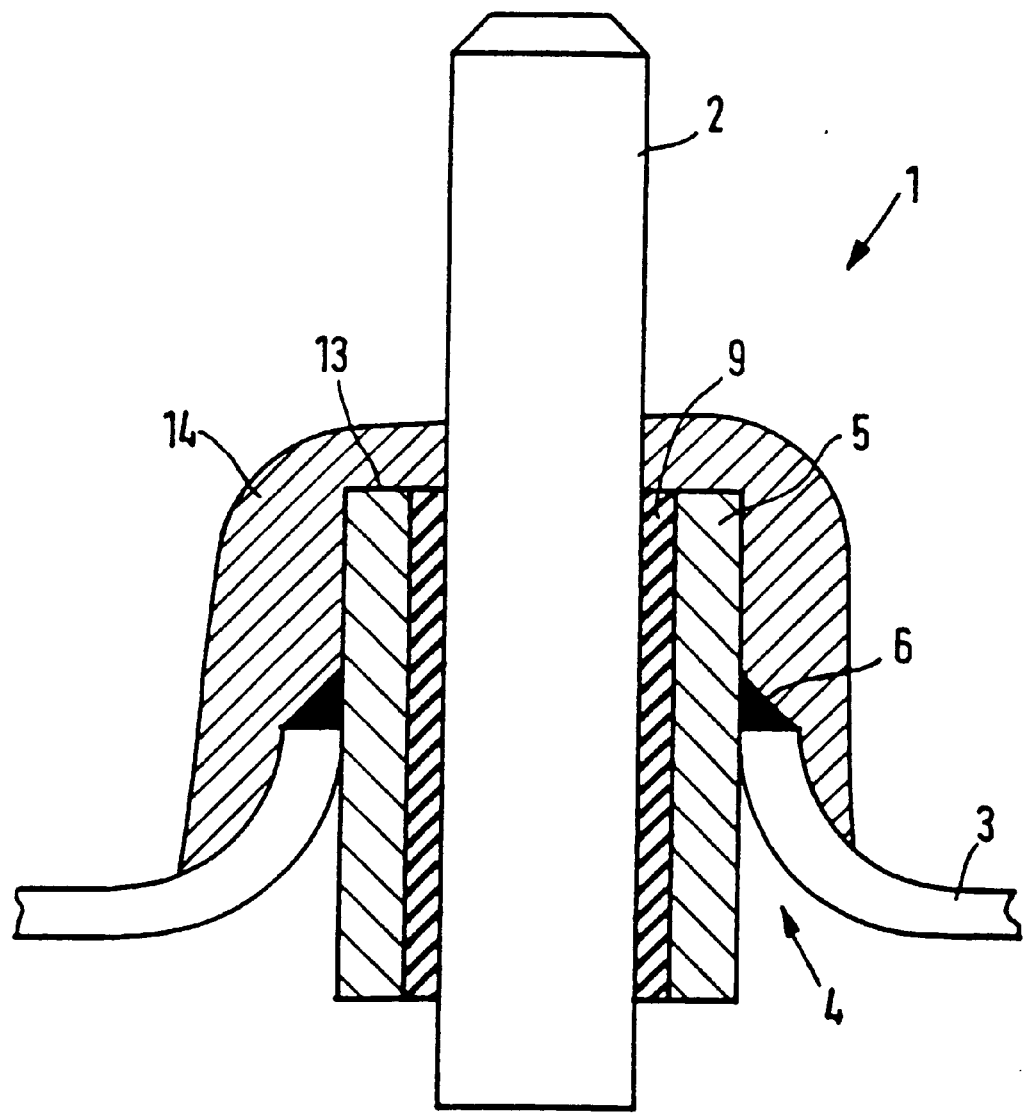
FIG. 3 is a similar view of a third embodiment of an electric lead-through assembly with a protective cap layer.

FIG. 3 shows a third embodiment of an electrically insulating lead-through assembly according to the invention, whereby an electrical conductor 2 is passed through a metal casing 3 of an exhaust gas system of an internal combustion engine. In the region of the lead-through assembly 1 the casing 3 has a through opening 4 through which a sleeve 5 extends. The sleeve 5 is welded to the casing 8 along a weld seam 6.

As in the other embodiments, the sleeve 5 is insulated from the electrical Conductor 2 by an electric insulation 9 which electrically decouples the conductor 2 from the sleeve 5. The conductor 2 is thus insulated from the casing 3.

The lead-through assembly 1 is protected with a protective layer 14, i.e. a protective cap, which is electrically non-conducting and which covers over the end face 13 and the outer peripheral surface of the sleeve 5. The protective layer 14 extends down over the casing 3 whereby the sleeve 5 in conjunction with the insulation 9, is decoupled from the electrical conductor 2 from the outside. In the illustrated embodiment the protective layer 14 consists of a single layer. It is also possible, of course, to form the protective layer 14 with a plurality of sublayers. A protective layer 14 with a plurality of sublayers is a particularly attractive feature where the sleeve 5 and the casing 3 exhibit different behavior with regard to thermal expansion and the like. Thermally induced stress cracks may be easily avoided in a multi-layered protective layer 14. The protective layer 14 is preferably pore-free so that accumulation of water on the protective layer 14 is avoided.

Figure 4:
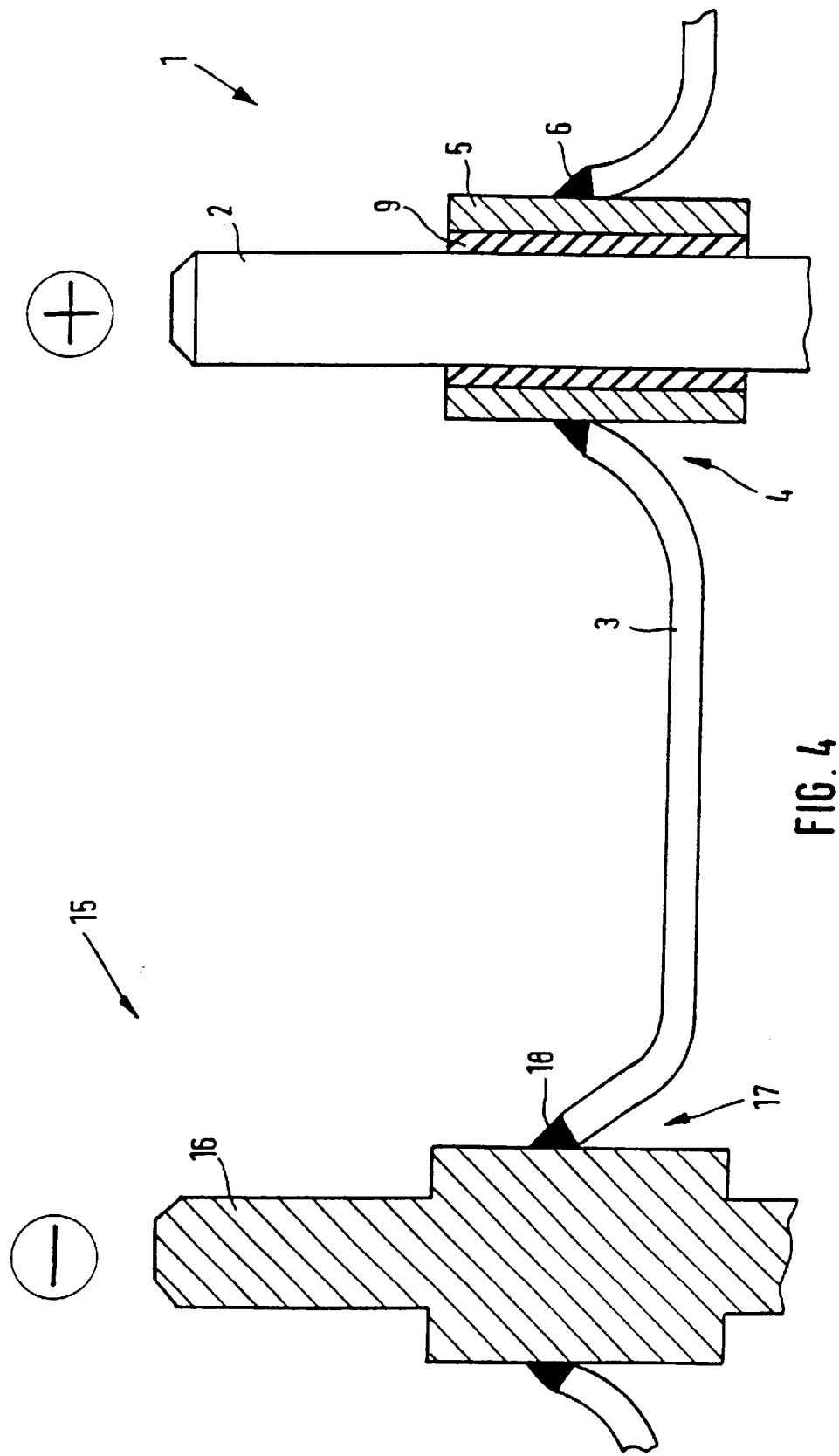
FIG. 4 is a partial sectional view of a fourth embodiment of the lead-through assembly.

FIG. 4 shows a further alternative configuration of a lead-through assembly with protection against electrocorrosion of the lead-through assembly. In the lead-through assembly 1 an electrical conductor 2 passes through a metal casing 3 of a catalytic converter. The casing 3 has a through opening 4, through which a sleeve 5 extends. The sleeve 5 is a metal sleeve. The casing 3 is welded to the sleeve 5 along the weld bead 6. An electric insulator 9 envelopes the conductor 2.

To avoid electrocorrosion occurring at the lead-through assembly there is provided a protective configuration 15 which puts the casing 3 and therewith the sleeve 5 at ground potential by virtue of an electrical connection. The protective configuration 15 has a connecting portion 16 which extends through an opening 17 in the casing 3. The connecting portion 16 is welded to the casing 3 at the position 18. The connecting portion 16 and the conductor 2 comprise the same metal material.

Figure 5:
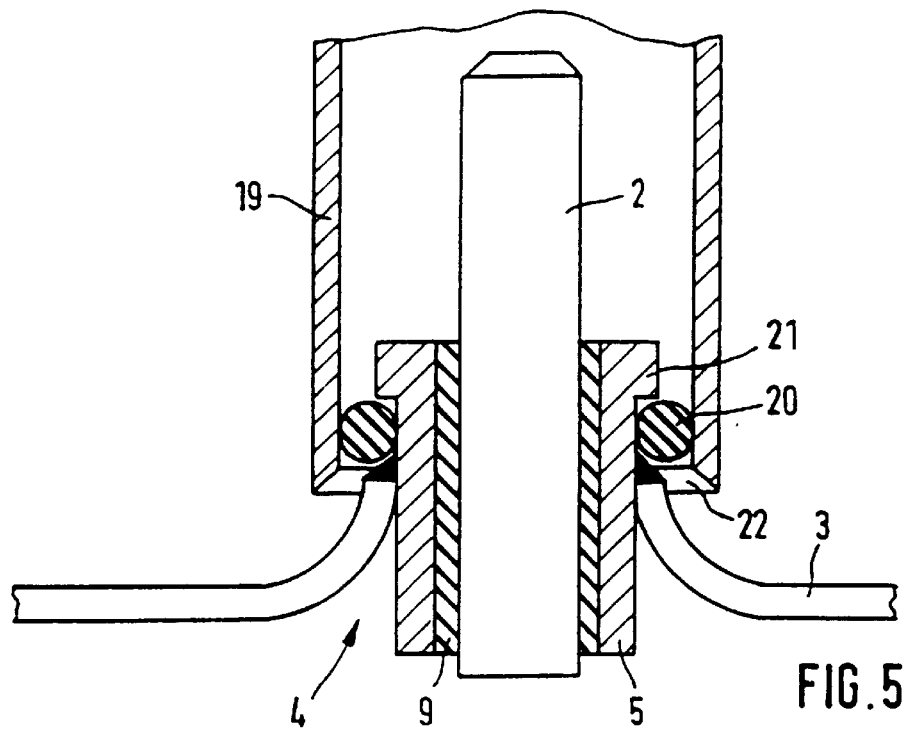
FIG. 5 is a partial sectional view of a fifth embodiment of the lead-through assembly with a housing.
Figure 6:
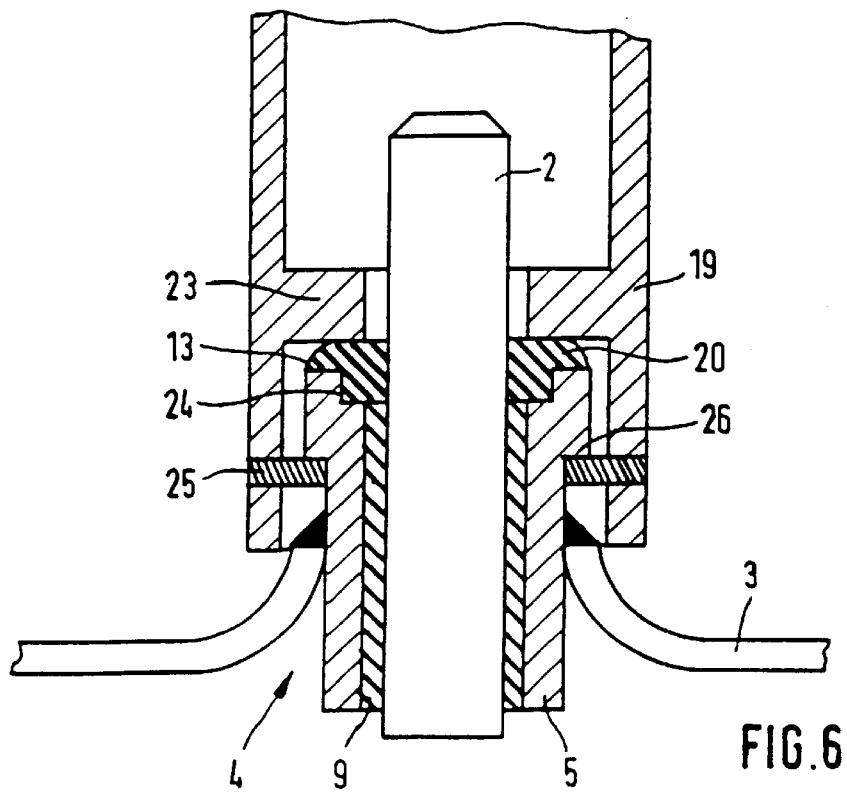
FIG. 6 is a similar view of a sixth embodiment of a lead-through assembly with a housing.

The two embodiments illustrated in FIGS. 5 and 6 are characterized by the housings 19 which form the protective configuration. The conductor 2 extends through a sleeve 5 which is welded in a through opening 4. The through opening 4 is provided in a casing 3 of a metal converter. Electric insulation 9 is provided between the conductor 2 and the metal sleeve 5. The sleeve 5 is welded to the casing 3 in the edge region of the through opening 4. The conductor 2 and the sleeve 5 are surrounded by a housing 19 of an electrically-insulating material. The housing 19 is fluid-tightly attached on the sleeve 5. This prevents any electrolyte from coming into contact with the electrical conductor 2. The housing 19 is formed with a non-illustrated conductor lead-through through which an electrical cable passes which is electrically connected to the conductor 2.

In the embodiment illustrated in FIG. 5 a sealing element 20 is arranged between the housing 19 and the sleeve 5. The sealing element 20 is an O-ring which is arranged on the sleeve 5. To secure the sealing element 20 on the sleeve 5 the latter has a peripherally extending flange 21. For more easily mounting the housing 19 in position it has an inclined insertion or lead-in surface 22. The internal cross-section of the housing 19 is so matched to the external contour of the sealing element 20 that, in the fitted-on condition of the housing, the sealing element 20 is squeezed together and forms a respective sealing surface between the sleeve 5 and the housing 19 respectively. No electrolyte can enter the housing 19 and the lead-through is thus maintained in a non-corrosive condition.

FIG. 6 shows a housing 19 which has a ring 23 extending peripherally around the housing 19 at the inside thereof. The ring 23 bears against a sealing element 20. The sealing element covers the end face 13 of the sleeve 5. A step configuration 24 is provided within the sleeve 5 to increase the area of the sealing surface between the sealing element 20 and the sleeve 5.

The housing 19 is further formed with a peripheral collar 25 which engages behind an undercut portion 26 provided on the outer peripheral surface of the sleeve 5. The collar 25 and the undercut portion 26 together form a retainer that prevents the housing 19 from being pulled off the assembly.

Figure 7:
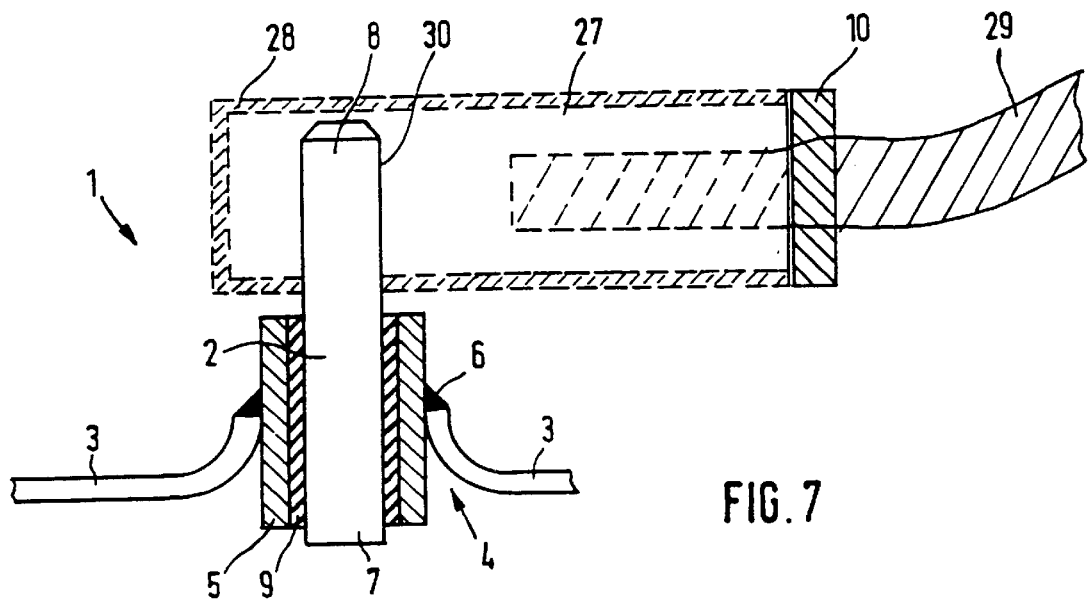
FIG. 7 is a partial sectional view of a seventh embodiment of a lead-through assembly with a housing.

FIG. 7 shows a seventh embodiment of an electrically insulating lead-through assembly 1 for an electrical conductor 2 to pass through a metal casing 3 of an exhaust gas system of an internal combustion engine, in particular an electrically heatable catalytic converter. As in the above-described embodiments, the casing 3 is formed with a through opening 4 through which a sleeve 5 extends. The metal sleeve 5 is welded to the casing 3 along the weld seam 6. The conductor 2 extends through the sleeve 5. The end 7 of the conductor 2, which projects into the casing 3, is in electrical contact with a non-illustrated catalytic converter honeycomb body. The end 8 of the conductor 2, which projects away from the casing 3 out of the sleeve 5, couples the converter monolith to an electric lead 29 connected to a non-illustrated voltage source. The conductor 2 is coupled to the electric lead 29 by means of a contact body 27. In the illustrated embodiment the electric lead 29 projects into the contact body 27.

For the purposes of mechanical and electrical coupling of the contact body 27 to the conductor 2 the contact body 27 has a blind bore 30. The bore 30 and the conductor 2 have a circular cross-section. The connection between the contact body 27 and the electrical conductor 2 is effected by means of a press fit. In other words, the bore 30 has a slightly smaller diameter than the conductor 2.

An anodic protective layer 28 is formed on the contact body 27. The protective layer preferably comprises zinc. Here, the sacrificial electrode 10 is arranged directly at the electric lead 29 which is connected to the contact body 27. The sacrificial electrode 10 may be connected to the electric lead 29 by squeezing the sacrificial electrode 10 onto the electric lead 29. It will be appreciated that, if necessary, the sacrificial anode can also be mounted directly on the conductor or the end 8 thereof insofar as they are not completely covered by the contact body 27.

Figure 8:
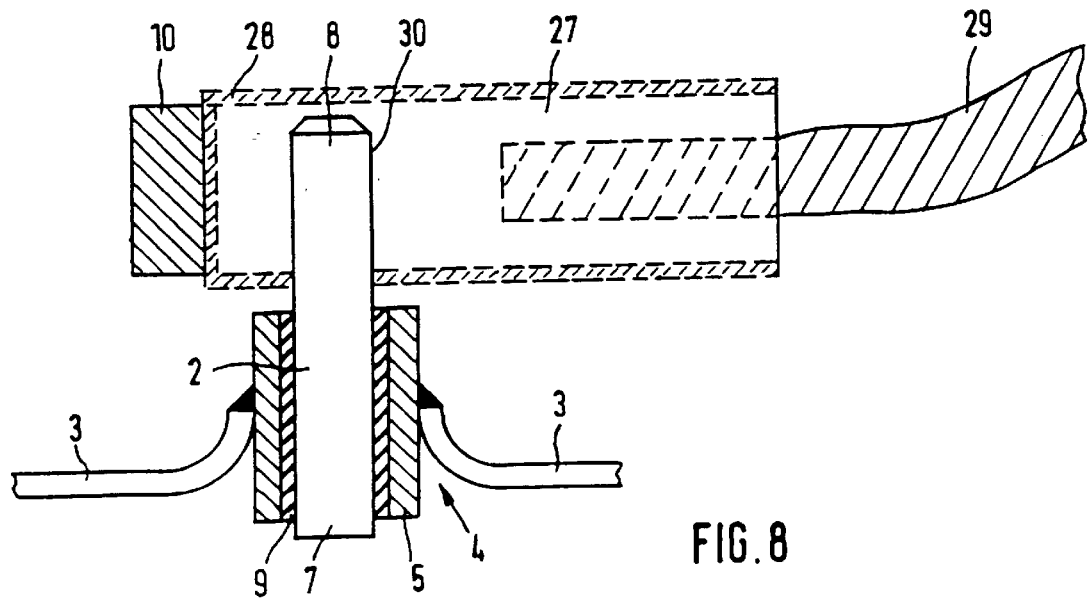
FIG. 8 is a partial sectional view of an eighth embodiment of a lead-through assembly with a housing.

FIG. 8 shows a further embodiment. Here, the sacrificial electrode 10 is disposed directly on the contact body 27. The positioning of the sacrificial electrode 10 on the contact body 27 as shown in FIG. 8 is given by way of example and can be suitably varied. Factors such as accessibility for purposes of inspection and exchange, space limitations, and ease of attachment, are just some which will define the best placement and ensure the steady operation of the sacrificial electrode in the assembly.

We claim:

1. An exhaust gas system of an internal combustion engine, comprising:
   a metal casing;
   said metail casing having an opening formed therein;
   a catalytic converter disposed in said metal casing;
   a lead-through assembly, including:
      a metal sleeve attached to said casing and extending through said opening; and
      an electrical conductor having two ends, one end projecting into said casing and being in electrical contact with said catalytic converter and the other end projecting away from said casing out of said sleeve; and
   a protective configuration protecting the lead-through assembly against electrocorrosion, said protective configuration including a sacrificial electrode being electrically connected to said sleeve.

2. The lead-through assembly according to claim 1, wherein said sacrificial electrode is disposed directly on said sleeve.

3. The lead-through assembly according to claim 2, wherein said sacrificial electrode is an annular electrode.

4. The lead-through assembly according to claim 2, wherein said sacrificial electrode is force-locked to said sleeve.

5. The lead-through assembly according to claim 2, wherein said sacrificial electrode is form-locked to said sleeve.

6. The lead-through assembly according to claim 1, wherein said sacrificial electrode is disposed on said casing and is electrically connected to said sleeve.

7. The lead-through assembly according to claim 6, wherein said sacrificial electrode is releasably connected to said casing.

8. The lead-through assembly according to claim 6, which further comprises a bolt affixing said sacrificial electrode to said casing.

9. The lead-through assembly according to claim 6, which further comprises a copper lead electrically connecting said sacrificial electrode to said sleeve.

10. The lead-through assembly according to claim 1, wherein said sacrificial electrode is formed of a material having a lower reduction potential in the electromotive series than a material of said conductor.

11. The lead-through assembly according to claim 10, wherein said sacrificial electrode comprises zinc.

12. An exhaust gas system of an internal combustion engine, comprising:
   a metal casting;
   said metal casting having an opening formed therein;
   a catalytic converter disposed in said metal casing;
   a lead-through assembly, including:
      a metal sleeve attached to said casing and extending through said opening; and
      an electrical conductor having two ends, one end projecting into said casing and being in electrical contact with said catalytic converter and the other end projecting away from said casing out of said sleeve; and
   a protective configuration connected to said metal casing for preventing electocorrosion of the lead-through assembly, said protective configuration being connected to an electric current path of a galvanic element formed in said lead-through assembly.

13. An exhaust gas system of an internal combustion engine, comprising:
   a metal casing;
   said metal casing having an opening formed therein;
   a catalytic converter disposed in said metal casing;
   a lead-through assembly, including:
      a metal sleeve attached to said casing and extending through said opening; and
      an electrical conductor having two ends, one end projecting into said casing and being in electrical contact with said catalytic converter and the other end projecting away from said casing out of said sleeve; and
   a protective configuration connected to said metal casing for preventing electocorrosion of the lead-through assembly, said protective configuration being formed by an electrical connection of said casing to ground potential.

* * * * *